United States Patent
Burgess et al.

(10) Patent No.: US 10,560,476 B2
(45) Date of Patent: Feb. 11, 2020

(54) SECURE DATA STORAGE SYSTEM

(71) Applicant: INTERNATIONAL BUSINESS MACHINES CORPORATION, Armonk, NY (US)

(72) Inventors: Luvita Burgess, Brisbane (AU); Narayana A. Madineni, Southport (AU); Leigh S. McLean, Nerang (AU); Peter T. Waltenberg, Robina (AU)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 15/439,365

(22) Filed: Feb. 22, 2017

(65) Prior Publication Data
US 2018/0241728 A1 Aug. 23, 2018

(51) Int. Cl.
*H04L 29/06* (2006.01)
*H04L 9/08* (2006.01)

(52) U.S. Cl.
CPC .......... *H04L 63/166* (2013.01); *H04L 9/0861* (2013.01); *H04L 63/083* (2013.01); *H04L 63/0861* (2013.01)

(58) Field of Classification Search
CPC ... H04L 63/166; H04L 9/0861; H04L 9/3215; H04L 9/3231; H04L 63/062; H04L 63/083; H04L 63/0861
See application file for complete search history.

(56) References Cited

U.S. PATENT DOCUMENTS

| 6,950,810 | B2 | | 9/2005 | Lapsley et al. | |
| 7,895,432 | B2 | | 2/2011 | Bjorn | |
| 8,225,384 | B2 | | 7/2012 | Pizano et al. | |
| 8,918,854 | B1 | * | 12/2014 | Giobbi | G06K 7/10366 726/9 |
| 9,374,369 | B2 | * | 6/2016 | Mahaffey | H04L 63/083 |

(Continued)

OTHER PUBLICATIONS

Gulcher et al., "Protection of Privacy by Third-Party Encryption in Genetic Research in Iceland," European Journal of Human Genetics, 2000, p. 739-742, vol. 8, Macmillan Publishers Ltd.
(Continued)

*Primary Examiner* — Joseph P Hirl
*Assistant Examiner* — Stephen T Gundry
(74) *Attorney, Agent, or Firm* — L. Jeffrey Kelly

(57) ABSTRACT

A computer program product for secure data storage. The present invention may include completing a registration process by sending, by the client device, a connection request to the server. The present invention may include generating, by the server, an authentication session identification (ID). The present invention may include sending, by the server, a stored salt and the generated authentication session ID to the client device. The present invention may include sending, by the server, the generated authentication session ID, the server encryption key and user data to the third-party device. The present invention may include sending, by the client device, the generated authentication session ID and user data to the third-party device. The present invention may include generating, by the third-party device, a decryption key. The present invention may include determining the user data received by the client device and the decrypted user data received by the server is authenticated.

17 Claims, 7 Drawing Sheets

(56) References Cited

U.S. PATENT DOCUMENTS

| | | |
|---|---|---|
| 9,378,348 B2 | 6/2016 | Little |
| 10,180,809 B2* | 1/2019 | Fetik .................... G06F 3/0653 |
| 2005/0033963 A1 | 2/2005 | Ronchi et al. |
| 2007/0061571 A1* | 3/2007 | Hammes ................ G06F 21/31 713/168 |
| 2009/0293111 A1 | 11/2009 | Lai et al. |
| 2010/0017596 A1* | 1/2010 | Schertzinger .......... G06F 21/33 713/155 |
| 2010/0299313 A1* | 11/2010 | Orsini .................... H04L 9/085 707/652 |
| 2013/0339749 A1 | 12/2013 | Spuehier et al. |
| 2014/0047238 A1* | 2/2014 | Harty .................. H04L 9/3236 713/168 |
| 2014/0208095 A1* | 7/2014 | Stuntebeck ............ H04L 63/06 713/152 |
| 2014/0331297 A1* | 11/2014 | Innes ...................... H04L 63/08 726/7 |
| 2015/0334108 A1* | 11/2015 | Khalil .................... G06F 21/31 726/8 |
| 2015/0372994 A1* | 12/2015 | Stuntebeck ......... H04L 63/0464 713/156 |
| 2015/0381621 A1 | 12/2015 | Innes et al. |
| 2016/0065370 A1* | 3/2016 | Le Saint ............... H04L 9/0891 713/155 |
| 2016/0094546 A1* | 3/2016 | Innes .................. H04L 63/0823 713/156 |
| 2016/0110560 A1* | 4/2016 | Forte .................... G06F 21/6209 713/171 |
| 2016/0218875 A1* | 7/2016 | Le Saint ............... H04L 9/0822 |
| 2016/0294794 A1* | 10/2016 | Mancic ................ H04L 63/061 |
| 2017/0012778 A1* | 1/2017 | Choyi ................ H04L 63/0884 |
| 2017/0250807 A1* | 8/2017 | Brannon ............. H04L 63/0823 |
| 2017/0257358 A1* | 9/2017 | Ebrahimi ............. H04L 9/3247 |
| 2017/0353450 A1* | 12/2017 | Koved ................ H04L 63/0861 |
| 2018/0007059 A1* | 1/2018 | Innes ...................... G06F 21/33 |
| 2018/0137512 A1* | 5/2018 | Georgiadis ............ H04L 9/3239 |
| 2018/0150647 A1* | 5/2018 | Naqvi .................... H04L 9/321 |
| 2018/0159833 A1* | 6/2018 | Zhang .................... H04L 29/06 |
| 2018/0227128 A1* | 8/2018 | Church ................ H04L 9/3247 |
| 2019/0146707 A1* | 5/2019 | Fetik .................... G06F 3/0653 |

OTHER PUBLICATIONS

Mell et al., "The NIST Definition of Cloud Computing," National Institute of Standards and Technology, Sep. 2011, p. 1-3, Special Publication 800-145.

Proctor et al., "A Task Analysis of Usability in Third-Party Authentication," Information Security Bulletin, Apr. 2000, p. 49-56, CHI Publishing Ltd.

* cited by examiner

SECURE DATA STORAGE SYSTEM

BACKGROUND

The present invention relates generally to the field of computing, and more particularly to secure storage systems.

Data stored for authentication purposes may be susceptible to malicious attacks on the data. Storing data as plain text may run the risk of being stolen, however plain text data, such as a password, may be changed. Changing a password that was stored as plain text data re-secures the data by taking the authentication process back from an attacker. Alternatively, biometric data, such as fingerprints, cannot be changed if the biometric data is stolen. Biometric data saved as plain text is susceptible to the same malicious attacks without the option to re-secure the data. Encrypting stored data may overcome some attacks, however, if an attacker is able to gain access to the encryption key, then the attacker may gain access to the stored data.

SUMMARY

Embodiments of the present invention disclose a method, computer system, and a computer program product for secure data storage. The present invention may include completing a registration process between a client device, a server, and a third-party device, wherein a server encryption key is generated by the server, wherein a salt is generated by the server and stored on the server, and wherein user data is sent from both the server and the client device. The present invention may also include sending, by the client device, a connection request to the server. The present invention may then include generating, by the server, an authentication session identification (ID) for the client device based on the sent connection request. The present invention may further include sending, by the server, a stored salt and the generated authentication session ID to the client device based on the connection request. The present invention may also include sending, by the server, the generated authentication session ID, the server encryption key and user data to the third-party device. The present invention may then include sending, by the client device, the generated authentication session ID and user data to the third-party device. The present invention may next include generating, by the third-party device, a decryption key based on the received authentication session ID, server encryption key and user data received by the client device and the server. The present invention may further include determining, by the third-party device, the user data received by the client device and the decrypted user data received by the server is authenticated.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
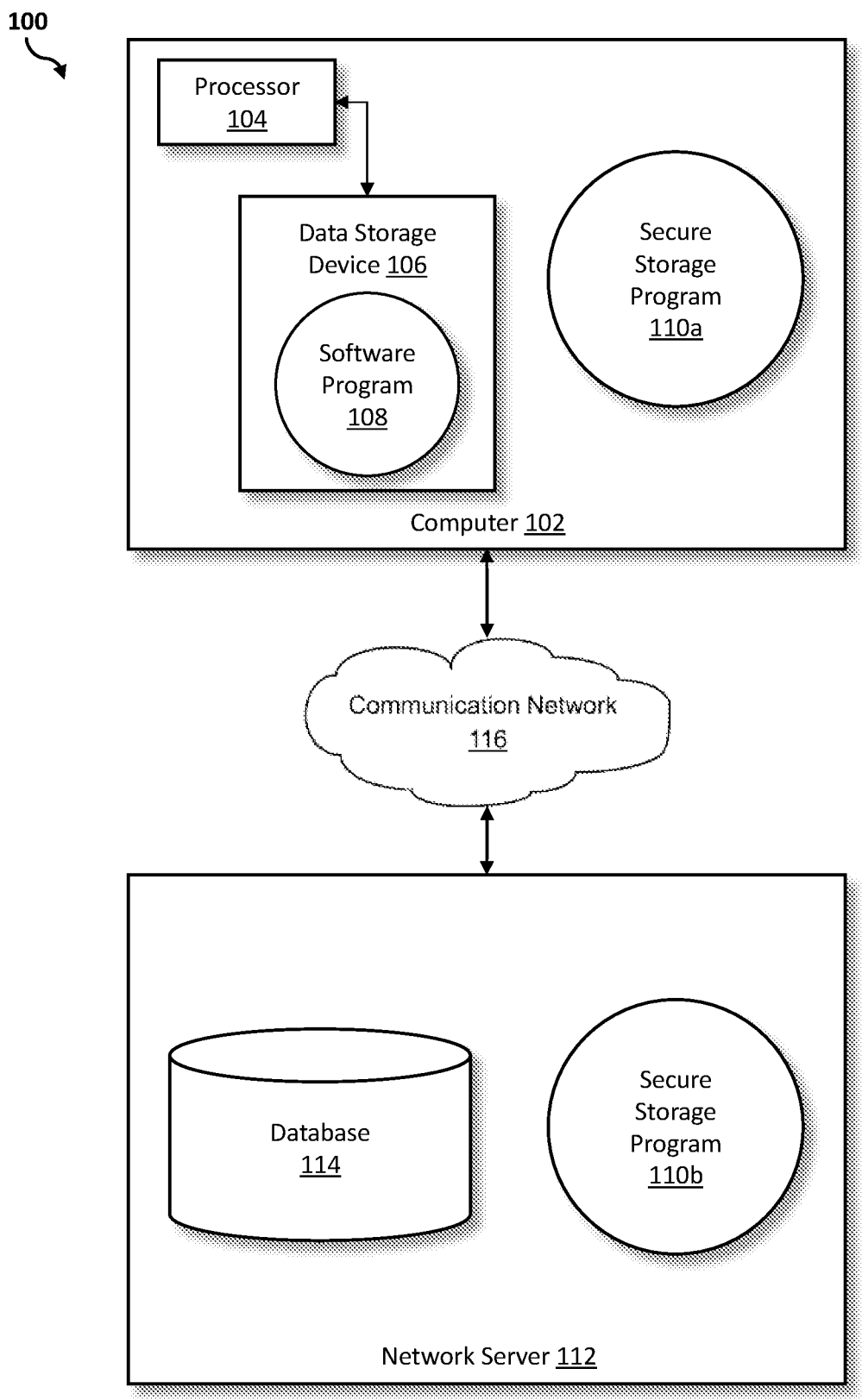
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for secure storage. As such, the present embodiment has the capacity to improve the technical field of secure storage by adding a third-party authority as a data matching service. More specifically, the present embodiment may secure storage by isolating where the data is stored from where the data is encrypted, decrypted and matched. A user may provide sensitive user data, such as biometric data, to gain access to a secure network. The server may store the encrypted user data packet (e.g., user encrypted password and biometric data) and the third-party authority may compare the biometric data provided by the user operating a client device with the encrypted user data packet sent from the server to the third-party authority to provide authentication for the user to gain access to a secure network. Biometric data may be considered sensitive user data that may not have the ability to change if the data is compromised, as distinguished from a password, that may be changed if compromised. The secure storage program may ensure that the server may store encrypted data that may not be decrypted by the server and the third-party authority may match sensitive user data, however, the third-party authority may not save data. The user operating the client device may memorize a password and may provide, for example, a fingerprint scan to access a secure network which may further isolate sensitive user data from being accessible to malicious attacks.

As described previously, data stored for authentication purposes may be susceptible to malicious attacks on the data. Storing data as plain text may run the risk of being stolen, however plain text data, such as a password, may be changed. Changing a password that was stored as plain text data re-secures the data by taking the authentication process back from an attacker. Alternatively, biometric data, such as fingerprints, cannot be changed if the biometric data is stolen. Biometric data saved as plain text is susceptible to the same malicious attacks without the option to re-secure the user data. Encrypting stored data may overcome some attacks, however, if an attacker is able to gain access to the encryption key, then the attacker may gain access to the stored data.

Typically, biometric data may be stored on a server or a third-party authentication server and whichever party stores the sensitive user data may also perform the biometric matching by encrypting and decrypting the biometric data. When one device both stores the data and matches the data through encryption and decryption, the data may be exposed and compromised. If an encryption key is stored on the same server that encrypts and decrypts the sensitive user data, then the data may be either deliberately or inadvertently exposed. Any compromise may expose every user's data on a server as there may be a single encryption key that may provide access to all users' sensitive data on the server.

Biometric data, as an example of sensitive user data, may be used to create a template to identify user authentication to access secure networks, applications or resources such as a secure database. Biometric data may consist of data such as fingerprints, iris recognition, retina scan and voice recognition. Fingerprints, iris recognition and retina scan may be captured on a scanning device or a camera on the client device. The voice recognition may be captured by a microphone on the client device. Biometric templates may identify a user and may be used for additional security, such as multi-factor authentication. Multi-factor authentication may require more than one separate piece of data to authenticate access. Additional levels of security authentication may control user access to systems. The authentication process may store biometric data during the registration process and retrieve the biometric data during validation.

Storing biometric data, for example in plain text form, can create a security risk if an attacker gains access to the server's database. If the biometric authentication data is stored on the server and the server also authenticates the data, then an attacker may gain access to both the data on the server and the biometric authentication information. Data used for primary authentication (e.g., passwords or personal identification numbers) may be stolen, however, the primary authentication data may also be reset by the user. Resetting the password or personal identification number (PIN) re-secures the users access to a secure network database and may further block the malicious attacker from gaining access to the network database since the password or PIN that previously worked has been changed. Alternatively, biometric data cannot be reset or altered, leaving the user and the server at risk for future attacks.

Instead of storing biometric data as plain text, biometric data may be encrypted by using the server's encryption key. Again, keeping the database information with the encryption key and the biometric data may leave all data on the server vulnerable. Vulnerability of the data to access may be, for example, from a hacker or from a system administrator. Anyone who gains access to the server, whether through an outside attack or from the inside the network, may have access to the encryption key, leaving the entire network database vulnerable with the ability to decrypt the encrypted biometric data back into plain text. This vulnerability may show that the unique and sensitive biometric data of a user may still be compromised even if encrypted.

An ephemeral key based on the server's encryption key along with a user's static authentication data (e.g., a password) may be used to encrypt sensitive user data needed to gain access to a secure network. An ephemeral key may be a non-persistent cryptographic key that is generated for each execution of a process (e.g., authentication). However, if the database data, the user's static authentication data (e.g., plain text data) and the biometric data sent by the user operating the client device are stored on the server, a deliberate attack on the server may still create vulnerability to the network database, application, resources and user data. Therefore, it may be advantageous to, among other things, create a secure storage system that protects the sensitive user data and the user plain text data by adding a third-party authority that encrypts and decrypts the data while the server stores the encrypted data.

The third-party authority may use a non-persistent encryption key derived from the server encryption key and static authentication data (e.g., data only known by the user) to encrypt sensitive user data such as biometric data. The storage server may store encrypted sensitive user data (e.g., biometric data) with other identifying user data, however the server may not have a decryption key, decrypt or access the sensitive user data. The third-party authority may encrypt and decrypt the sensitive user data and other identifying user data with information known to the user operating the client device and the server. For example, the user operating the client device may provide a password and a fingerprint scan to the third-party authority and the server may provide an encryption key to the third-party authority for encryption of sensitive user data.

Proposing a mechanism to protect data may be done by isolating the storage of the user data from the encryption and decryption of the user data. The third-party authority may perform sensitive user data (e.g., biometric data) matching, however, the third-party authority may not store sensitive user data or identifying user data, such as user ID, username, email, name, address, and phone number. Identifying user data may be distinguished from sensitive user data since identifying data may be used to verify a user to a particular account, such as a bank account. Some identifying information may be available to the public, such as a name, address or phone number. Sensitive user data may be data that may not be altered, such as biometric data. For example, biometric data may be captured by a user's fingerprints, iris recognition, retina scan, or voice recognition obtained by using lasers, scanners, or voice recognition software.

The amount of compromised data may be significantly less when the matching server is isolated from the data. Further, for companies who may want to secure data, penalties may vary significantly depending on the magnitude of the breach. Using a separate authority to encrypt and decrypt one user data packet at a time may reduce the scope of an attack from all users' data stored on the server to one user's data at a time via the third-party server (i.e., matching server), which may only have access to the biometric information being matched at one time and no other information identifying the current user. The three devices, a client device, a server and a third-party authority may make up a secure storage network environment. The secure storage network may have a registration process and an authentication process. The client device may communicate via a communication network to both the server and the third-party authority for purposes of registering a user operating a client device with a secure network and authenticating user access to a secure network. The server may securely store encrypted identifying user data and sensitive user data (e.g., biometric data). The third-party authority may provide encryption, decryption and data matching services.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a secure storage program 110a. The networked computer environment 100 may also include a network server 112 that is enabled to run a secure storage program 110b that may interact with a database 114 and a communication network 116. The networked computer environment 100 may include a plurality of computers 102 and network servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the network server 112 via the communications network 116. The communications network 116 may include connections, such as wire, wireless communication links, or fiber optic cables. As will be discussed with reference to FIG. 5, network server 112 may include internal components 902a and external components 904a, respectively, and client computer 102 may include internal components 902b and external components 904b, respectively. Network server 112 may also operate in a cloud computing service model, such as Software as a Service (SaaS), Platform as a Service (PaaS), or Infrastructure as a Service (IaaS). Network server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the secure storage program 110a, 110b may interact with a database 114 that may be embedded in various storage devices, such as, but not limited to a computer/mobile device 102, a network server 112, or a cloud storage service.

According to the present embodiment, a user operating a client computer 102 or a network server 112 may use the secure storage program 110a, 110b (respectively) to secure biometric data from being compromised if the network server is hacked. The secure storage method is explained in more detail below with respect to FIGS. 2-4.

Figure 2:
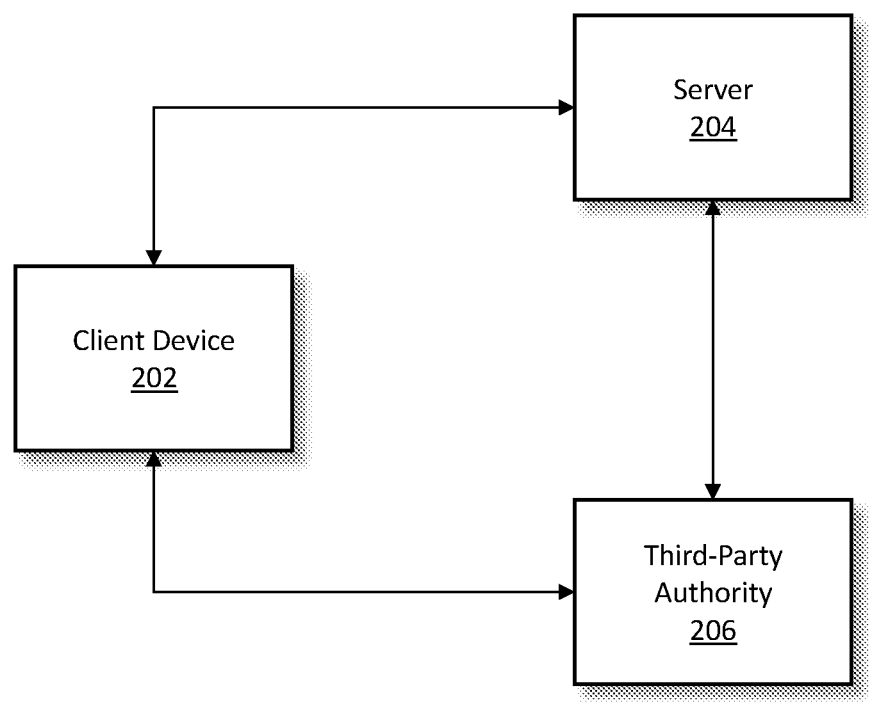
FIG. 2 illustrates a secure storage system environment according to at least one embodiment.

Referring now to FIG. 2, a system block diagram illustrating a secure storage network 200 according to at least one embodiment is depicted. The secure storage network may include a client device 202 (e.g., client computer 102) capable of sending and receiving data, a server 204 and a third-party authority 206. A user may operate the client device 202. The client device 202, server 204 and third-party authority 206 within the secure storage network 200 may communicate via a communication network 116. Additionally, the client device 202, the server 204 and the third-party authority 206 may run the secure storage program 110a, 110b.

The secure storage program 110a, 110b may protect data (e.g., biometric data) by isolating the storage of the data from the encryption and decryption of the data. The client device 202 may be, however is not limited to, a computer 102, a cellular phone, a tablet, a watch or a building access control device. The client device 202 may not store any data since the user may memorize a password or other identifying information and may provide biometric data for authorization.

The server 204 may be a network server 112. A server 204 may store the encrypted data made up of identifying user data and sensitive user data (e.g., biometric data). User data may be information such as, but not limited to, a user ID, username, email, name, address, phone number, user salt, user encrypted data packet and a server key. A user ID may be a username created by the user, for example, to log into a secure network. A salt may be a form of cryptography that may add random data to user data (e.g., a password) to safeguard stored data. A salt may also be randomly generated at the registration process and remain the same salt unless regenerated for changes in user data (e.g., user ID or password). Salts may also protect users in cases where the user has the same password for many different accounts and when the user has regular words (i.e., words that may be found in a dictionary) in their password. Salted passwords strengthen internet security from attacks.

The server 204 may generate an encryption key and store encrypted user data, however, the server 204 may not decrypt or have access to the data. When a server 204 receives and stores encrypted data, the encrypted data may not be decrypted by the server 204, a server administrator or a malicious attacker who may breach the server 204. The server 204 may not receive or store unencrypted sensitive user data (e.g., biometric data) since the user and the client device 202 may not send static authentication data or biometric data to the server 204. Since the server 204 may not have the ability to access the sensitive user data, the server 204 may not leak the user's sensitive information either deliberately or inadvertently.

The third-party authority 206 may be used to perform encryption, decryption and data matching services. The third-party authority 206 may also be known as a matching server. The third-party authority 206 may also be a server that is universally trusted and may provide a similar function as a certificate authority. The third-party authority 206 may use an encryption key (e.g., a non-persistent encryption key) derived from the server encryption key and the static authentication data known only by the user to encrypt the biometric data. The secure storage program 110a, 110b may use a non-persistent encryption key (i.e., an ephemeral key) that is created at the time the key may be needed and only lasts for a short period of time.

The third-party authority 206 may require the user salted password hash and the server key to encrypt biometric data from the user during the registration process. During the authentication process, the third-party authority 206 may decrypt the encrypted biometric data from the server 204. The third-party authority 206 may generate an encryption key and match data from the user operating the client device 202 and the server 204, however, the third-party authority 206 may not store data. Data matching a user's sensitive information (e.g., biometric matching) by the third-party authority 206 may pose no persistent risk of exposing the user's sensitive information without the user's consent since the third-party authority 206 may not have access to the identifying user data. The third-party authority 206 may also not store any sensitive user data or an encryption key, further securing a user's identity and access to sensitive data.

As such, any compromise in the secure storage network 200 may be in a limited capacity since each network device, the client device 202, the server 204 and the third-party authority 206, may not store complete unencrypted user details on any one device. The client device 202 may provide passwords, sensitive user data and a session identification (ID) to the third-party authority 206. The server 204 may provide a salt and session ID to the client device 202 and a server key and session ID to the third-party authority 206. The third-party authority 206 may provide an encrypted user data packet, a session ID and an authentication success or an authentication failure message to the server 204.

Figure 3:
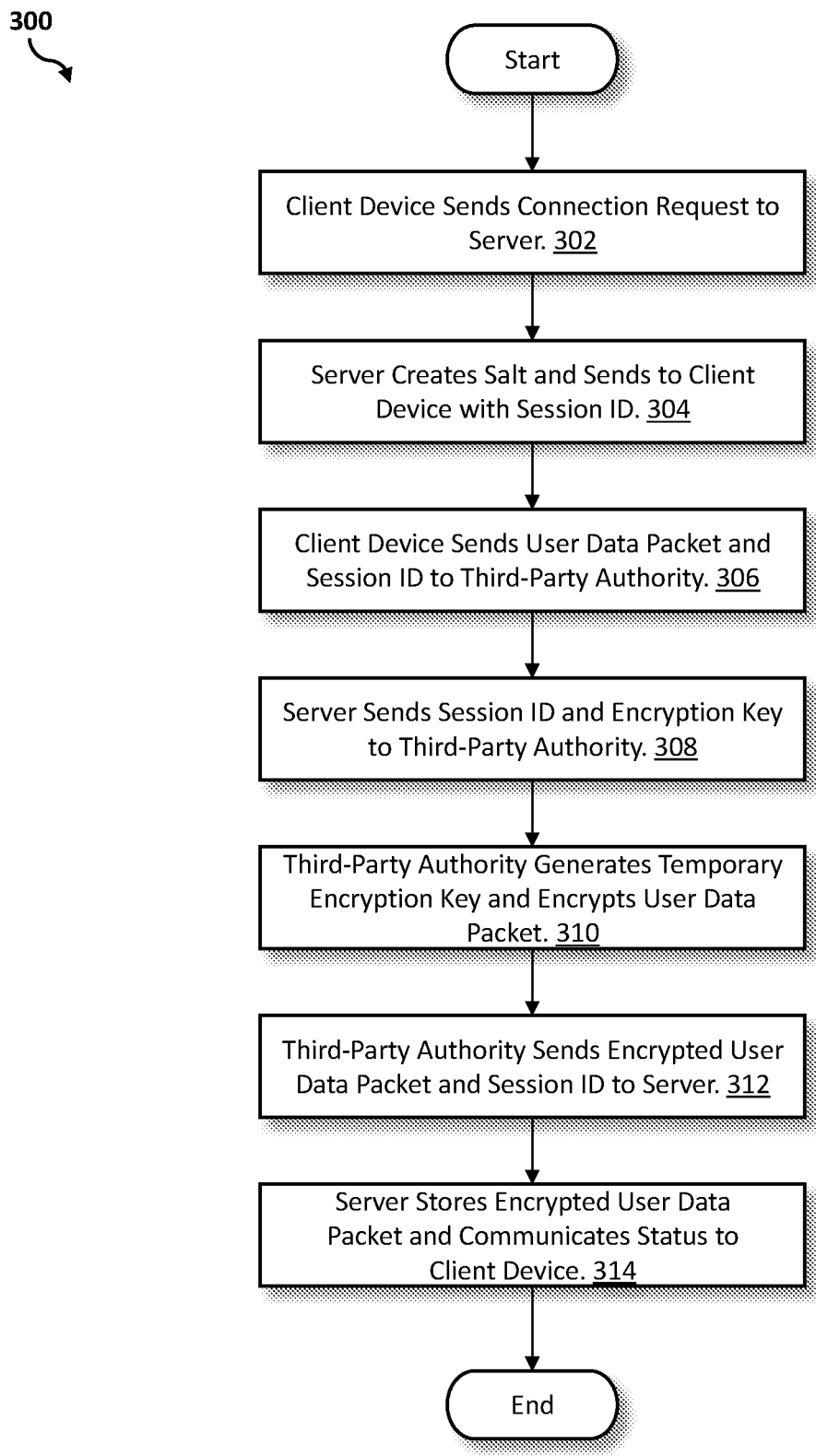
FIG. 3 is an operational flowchart illustrating a secure storage registration process according to at least one embodiment.

Referring now to FIG. 3, an operational flowchart illustrating the exemplary secure storage registration process 300 used by the secure storage program 110a, 110b according to at least one embodiment is depicted. The registration process may register the user data via the client device 202 with the server 204.

At 302, the client device 202 sends a connection request to the server 204. The connection request may be, for example, via a transport layer security (TLS) or a secure sockets layer (SSL) channel. Both TLS and SSL may establish secure connections over a network and may establish an encrypted link between the client device 202 and the server 204 to ensure data passed between devices remains secure. For example, the user may wish to establish a connection to an online banking account that contains the user's banking information. In order to access the banking system network, the user creates an online account profile with the bank's server by using basic identifying information, such as name, address and account number. The user may then create and register a user ID for future access to banking accounts. The identifying user data will be sent from the user's client device 202 to the server 204 through a TLS connection or a SSL connection. The secure storage registration process 300 may be done one time per user unless the user may want to change their username or other identifying information with their account.

Next at 304, the server 204 creates a salt and sends the salt to the client device 202 with a session ID. The salt may be a random number sequence that the server 204 associates with a user operating a client device 202. The server 204 may generate a salt for the user secure storage registration process 300 and may store the generated salt specifically for the user operating the client device 202 registering with the server 204. The server 204 may store both the user ID and the salt. The session ID may be created by the server 204 as a temporary random number that may be associated with that particular registration session between the client device 202 and the server 204. The session ID may be a unique number associated with a specific session and may not be stored once the registration process is complete. Once the user salt and the session ID have been created by the server 204, the server 204 may send both the user salt and session ID to the client device 202.

Continuing the previous example, once the user has sent a connection request to the server 204 and has input identifying information for the bank to verify that the user is a customer attempting to gain access to a bank account, the server 204 creates a salt and a session ID to associate the user registration with a particular session. Once the client device 202 has received the salt and the session ID, the user may create a password for future access to a bank account without needing to register each time the user wants to access bank information.

Then at 306, the client device 202 sends the user data packet and session ID to the third-party authority 206. After receiving the salt and session ID from the server 204, the user may create a password upon registration for access to a secure network. The client device 202 may hash the salted password by using the salt and the user's static authentication (e.g., password or PIN) to create a unique hash of these values. Once the salted password is hashed, the client device 202 may send the hashed salted password, the session ID and the sensitive user data (e.g., biometric data) to the third-party authority 206 via a secure channel (e.g., TLS or SSL). The user data packet may consist of the user hashed salted password and the sensitive user data (e.g., biometric data). The user data packet may also consist of the user hashed salted password and hashed sensitive user data.

For example, the user may maintain control over the password and the biometric data and the client device 202 creates a hash of the password using the salt provided by the server 204. A user registering to gain access to their bank account may memorize a password and use a fingerprint scan to verify identity with the third-party authority 206, therefore, further isolating and securing data from being stored on any device unencrypted. The client device 202 may combine the salt provided by the server 204 with the password created by the user and hash the salted password. The user may add a biometric component, such as a fingerprint scan, to the security of accessing the bank's secure network database and the user's computer (e.g., client device 202) may send the salted password hash and the biometric data to the third-party authority 206 for registration and encryption purposes.

Next at 308, the server 204 sends the session ID and encryption key to the third-party authority 206. The server 204 may send the session ID and the encryption key to the third-party authority 206 either before or after the client device 202 sends the user data packet and session ID to the third-party authority 206. Alternatively, the server 204 may send the session ID and encryption key to the third-party authority 206 right after the server 204 sends the salt and session ID to the client device 202. The server encryption key may be an encryption key that is unique to the client device 202, which may be associated with identifying user data such as a user ID. The server encryption key may, alternatively, be unique to the server 204.

Then at 310, the third-party authority 206 generates a temporary encryption key and encrypts the user data packet. The third-party authority 206 may first verify that the session ID's match between the client device 202 and the server 204. The third-party authority 206 may then create a temporary encryption key derived from the client device 202 hash and the server encryption key. For example, the client device 202 may have sent the hashed salted password and unhashed biometric data to the third-party authority 206. The client device 202 may also have sent the hashed salted password and hashed biometric data to the third-party authority 206. The temporary encryption key may be used by the third-party authority 206 to encrypt the user data packet. The secure storage program 110a, 110b may encrypt the user data packet at the third-party authority 206 to ensure the server 204 does not gain access to the encrypted data. The third-party authority 206 may wait to receive data from both the client device 202 and the server 204 before the third-party authority 206 correlates the data to identify the user. The third-party authority 206 may use the server encryption key and the user data packet to generate a temporary encryption key. After the third-party authority 206 encrypts the user data packet, the third-party authority 206 may destroy the encryption key.

In order to keep the user's sensitive data secure, the secure storage program 110a, 110b may not allow the third-party authority 206 to store sensitive user data. The secure storage program 110a, 110b may also not allow the server 204 to store unencrypted sensitive user data or may not allow the server 204 to have the ability to decrypt the sensitive user data.

Next at 312, the third-party authority 206 sends the encrypted user data packet and session ID to the server 204. The secure storage program 110*a*, 110*b* may ensure that the server 204 stores the encrypted user data packet, however, the server 204 may not have access to the user data packet or decrypt the user data packet. The secure storage program 110*a*, 110*b* may isolate the storage of sensitive data from access to sensitive data on the server 204 by using a non-persistent encryption key that may be created at the third-party authority 206. The session ID attached to the encrypted user data packet sent from the third-party authority 206 to the server 204 may verify to the server 204 that the session is complete and the encrypted user data packet may be stored for that particular user. In continuation of the previous example, the user's hashed salted password and fingerprints are encrypted at the third-party authority 206 and sent from the third-party authority 206 to the server 204 as an encrypted data packet for storage until the user wishes to gain access to a bank account.

Then at 314, the server 204 stores the encrypted user data packet and communicates the status to the client device 202. As previously stated, the server 204 stores the encrypted user data packet and may not access the data inside the user data packet. Once the encrypted packet has been transferred from the third-party authority 206 to the server 204, the server 204 may communicate to the client device 202 that the registration is complete. From the previous example, the bank will store the user encrypted data until the user operating the client device 202 attempts to authenticate and gain access to a bank account on the bank's secure network. The server 204 may send a message to the client device 202 to communicate that the registration process is now complete.

Figure 4:
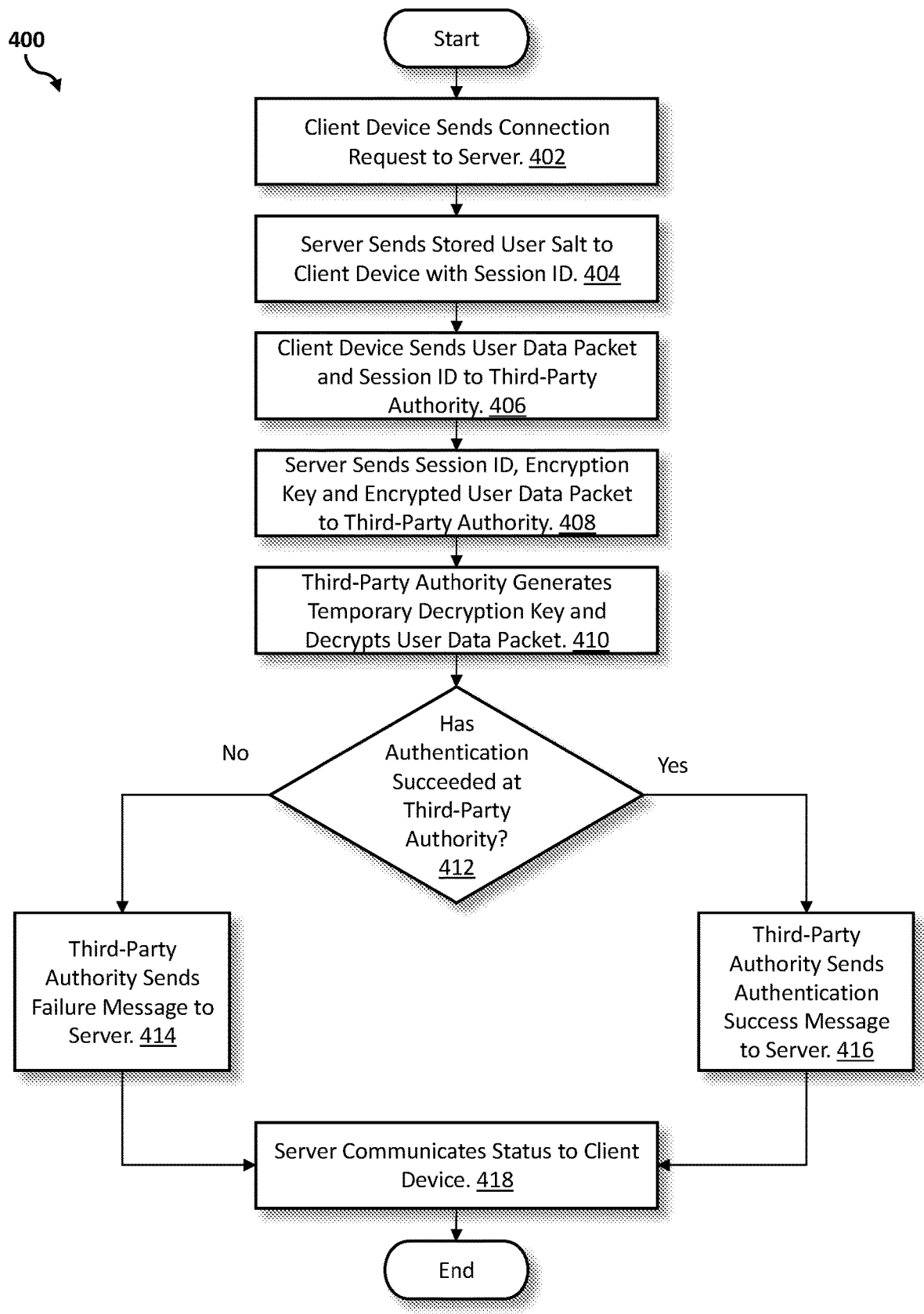
FIG. 4 is an operational flowchart illustrating a secure storage authentication process according to at least one embodiment.

Referring now to FIG. 4, an operational flowchart illustrating the exemplary secure storage authentication process 400 used by the secure storage program 110*a*, 110*b* according to at least one embodiment is depicted.

At 402, the client device 202 sends a connection request to the server 204. The connection request may be, for example, via a transport layer security (TLS) or a secure sockets layer (SSL) channel. Both TLS and SSL may establish secure connections over a network and may establish an encrypted link between the client device 202 and the server 204 to ensure data passed between devices remains secure. For example, the user may wish to establish a secure connection to an online banking account that contains the user's banking information. In order to access the banking system network, the user authenticates access to the bank's secure database by entering a user ID. The user ID will be sent from the user's client device 202 to the server 204 through a TLS connection or a SSL connection. The secure storage authentication process may be done each time the user wishes to access a bank account by using the same user ID that was created during the registration process at 302.

Next at 404, the server 204 sends the stored user salt to the client device 202 with a session ID. The stored user salt may have been created at 304 during the secure storage registration process 300. The salt may be a random number sequence that the server 204 associates with a user operating a client device 202. The salt may be stored on the server 204 and the same salt may be used each time a user operating a client device 202 sends a connection request to the server 204 to authenticate the user's session. The session ID may be a unique number associated with a specific session and may not be stored once the session is complete. The session ID may be created by the server 204 as a temporary random number that may be associated with that particular authentication session between the client device 202 and the server 204. An example of when the server 204 may send the stored user salt and a session ID to a client device 202 may be when a user is attempting to access their bank account and when the user may have previously completed the secure storage registration process 300.

Continuing the previous example, once the user has sent a connection request to the server 204 and has input identifying information for the bank to verify that the user is a customer attempting to gain access to a bank account, the server 204 recognizes the user ID and that the user has previously registered to gain access to a bank account. The stored user salt and a session ID are then sent to the user operating the client device 202 to associate the user authentication with a particular session. Once the client device 202 has received the stored user salt and the session ID, the user may use a previously created password and fingerprint scan to gain access to a bank account.

Then at 406, the client device 202 sends the user data packet and the session ID to the third-party authority 206. After receiving the salt and session ID from the server 204, the user may use the password created during the secure storage registration process 300 for authentication and access to a network system. The client device 202 may send the hashed salted password, the session ID and the sensitive user data (e.g., biometric data) to the third-party authority 206 via a secure channel (e.g., TLS or SSL). The user data packet may consist of the user hashed salted password and the sensitive user data (e.g., biometric data). The user data packet may also consist of the user hashed salted password and hashed sensitive user data.

For example, the user may maintain control over and send the hashed salted password and the biometric data (i.e., user data packet) to the third-party authority 206 for authentication along with the session ID. A user operating a client device 202 to authenticate credentials to gain access to their bank account may maintain control over where sensitive user data may be stored by memorizing a password and using a fingerprint scan to verify identity, therefore, further isolating and securing data from being stored on any device unencrypted. The client device 202 may combine the salt provided by the server 204 with the password created by the user and hash the salted password. The user will add a biometric component, such as a fingerprint scan, to the security of accessing the bank's data and the user computer (e.g., client device 202) will send the salted password hash and the biometric data (i.e., user data packet) to the third-party authority 206 for authentication purposes.

Next at 408, the server 204 sends the session ID, encryption key and the encrypted user data packet to the third-party authority 206. The server 204 may retrieve the stored encrypted user data packet associated with a user ID and send the session ID, encryption key and the retrieved stored encrypted user data packet to the third-party authority 206 either before or after the client device 202 sends the user data packet and session ID to the third-party authority 206. Alternatively, the server 204 may send the session ID, encryption key and stored encrypted user data packet to the third-party authority 206 right after the server 204 sends the stored user salt and session ID to the client device 202. The server encryption key may be an encryption key that is unique to the client device 202, which may be associated with identifying user data such as a user ID. The server encryption key may alternatively be unique to the server 204.

Then at 410, the third-party authority 206 generates a temporary decryption key and decrypts the user data packet. The third-party authority 206 may first verify that the session ID's match between the client device 202 and the server 204. The third-party authority 206 may then generate a temporary decryption key derived from the client device hash and the server encryption key. The decrypted user data packet may contain the user's hashed salted password and user's sensitive data (e.g., biometric data).

For example, the client device 202 may have sent a user data packet containing a hashed salted password and unhashed biometric data to the third-party authority 206. The client device 202 may also have sent a user data packet containing a hashed salted password and hashed biometric data to the third-party authority 206. The temporary decryption key may be used by the third-party authority 206 to decrypt the user data packet. The secure storage program 110a, 110b may temporarily decrypt the user data packet at the third-party authority 206 to ensure the server 204 does not gain access to the decrypted data. The third-party authority 206 may wait to receive data from both the client device 202 and the server 204 before the third-party authority 206 correlates the data to identify and authenticate the user. After the third-party authority 206 decrypts the user data packet and the session is complete, the third-party authority 206 may destroy the decryption key.

In order to keep the user's sensitive data (e.g., biometric data) secure, the secure storage program 110a, 110b may not allow the third-party authority 206 to store user data (e.g., hashed salted password and biometric data). The secure storage program 110a, 110b may also not allow the server 204 to store unencrypted sensitive user data or may not allow the server 204 to have the ability to decrypt the sensitive user data.

Next at 412, the secure storage program 110a, 110b determines if authentication has succeeded at the third-party authority 206. For authentication to succeed, the third-party authority 206 may compare the session ID sent from the client device 202 and the session ID sent from the server 204 to ensure the session IDs match. For the next level of authentication to succeed, the third-party authority 206 may compare the hashed salted password sent from the client device 202 with the decrypted hashed salted password that was sent from the server 204 as an encrypted user data packet to ensure the hashed salted passwords match. For the next level of authentication to succeed, the third-party authority 206 may compare the sensitive user data (e.g., biometric data) sent from the user operating the client device 202 with the decrypted sensitive user data (e.g., biometric data) that was sent from the server 204 as an encrypted user data packet to ensure the sensitive user data matches. If all the comparisons (i.e., the session ID, the user hashed salted password and the biometric data) match, then the secure storage program 110a, 110b may authenticate the user for access to a network.

In a continuation of the previous example of a user accessing a bank account, and after the user has completed the registration process with the bank, the bank's client will access an account by first putting in a user ID on the bank's website. Then the client will follow by inputting an already established password along with a fingerprint scan for access to an account. The third-party authority 206 may match the session ID, the password and fingerprints with the encrypted data sent to the third-party authority 206 by the server 204.

If the secure storage program 110a, 110b determines that authentication has not succeeded at the third-party authority 206, then the third-party authority 206 sends a failure message to the server 204 at 414. Not authenticating the data sent by the user (e.g., user data packet and session ID) with the encrypted data sent by the server 204 (e.g., encrypted user data packet, session ID and encryption key) may represent someone who is not the user may be trying to access an account they do not belong to or information they should not have access to. For example, if a hacker is attempting to access someone else's bank account and the user ID, password and session ID match, however, the fingerprint scan did not match the real user who completed the registration process with the bank, then the third-party authority 206 will send an authentication failed message to the server 204.

If the secure storage program 110a, 110b determines that the authentication has succeeded at the third-party authority 206, then the third-party authority 206 sends an authentication success message to the server 204 at 416. Authenticating the data sent by the user (e.g., user data packet and session ID) with the data sent by the server 204 (e.g., encrypted user data packet, session ID and encryption key) may represent someone who is the user may be trying to access an account they should have access to. For example, if a user is attempting to access a bank account owned by the user, they will submit their user ID, password and fingerprint scan. When all of the inputted data matches what the server 204 sent to the third-party authority 206 and the session IDs match, then the third-party authority 206 will send an authentication succeeded message to the server 204.

If the third-party authority 206 sends a failure message to the server 204 at 414 or if the third-party authority 206 sends an authentication success message to the server 204 at 416, then the server 204 communicates the status to the client device 202 at 418. The authentication failure message or the authentication succeeded message may be shown on the network website to alert the user that access to the network has been denied or allowed. The succeeded or failed authentication message may be presented to the user, for example, by an email message, a text message or a voice message from client device 202.

It may be appreciated that FIGS. 2-4 provide only an illustration of one embodiment and do not imply any limitations with regard to how different embodiments may be implemented. Many modifications to the depicted embodiment(s) may be made based on design and implementation requirements.

Figure 5:
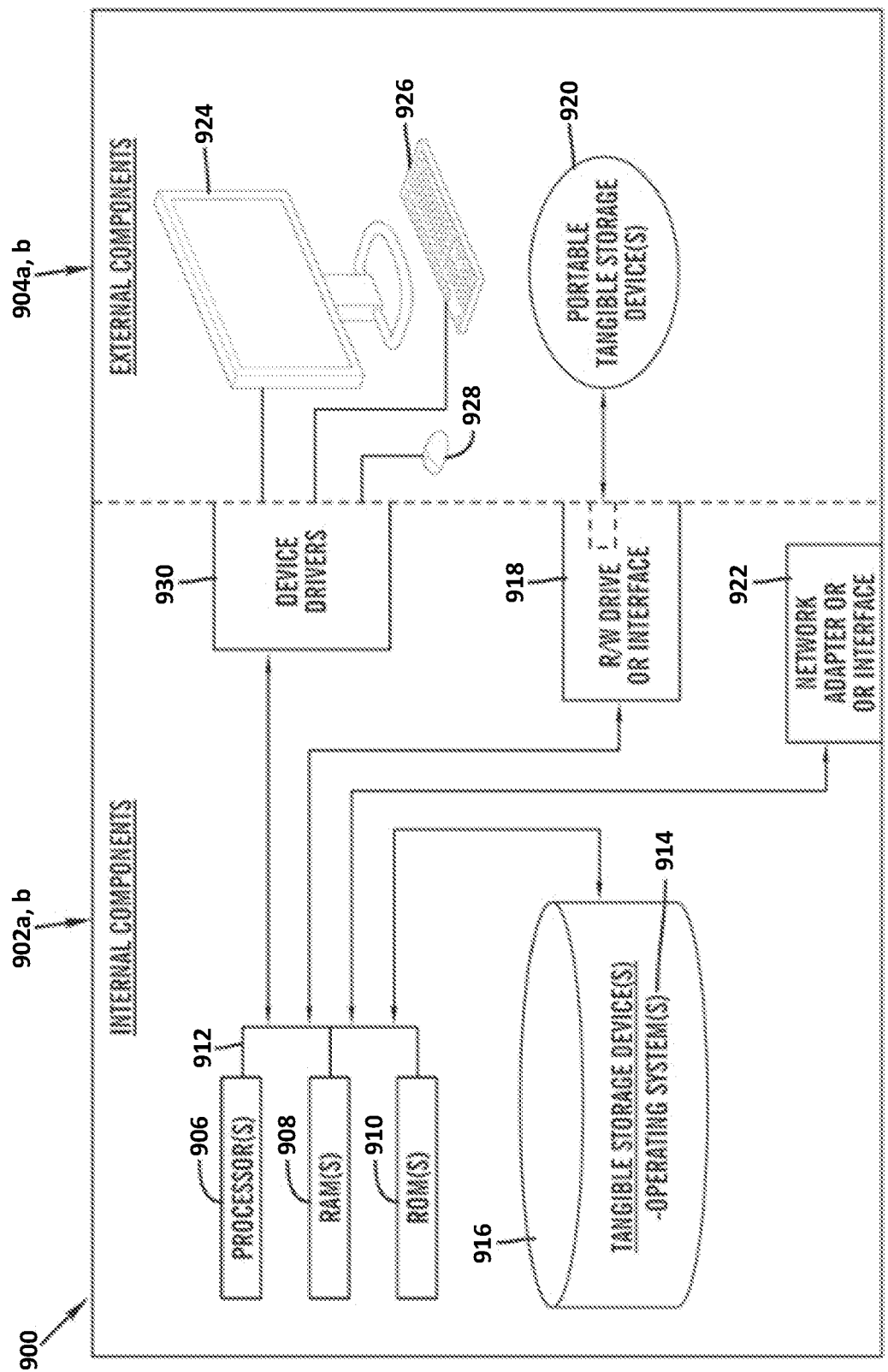
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the secure storage program 110a in client computer 102, and the secure storage program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the secure storage program 110a, 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the secure storage program 110a in client computer 102 and the secure storage program 110b in network server 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the secure storage program 110a in client computer 102 and the secure storage program 110b in network server 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third-party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third-party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
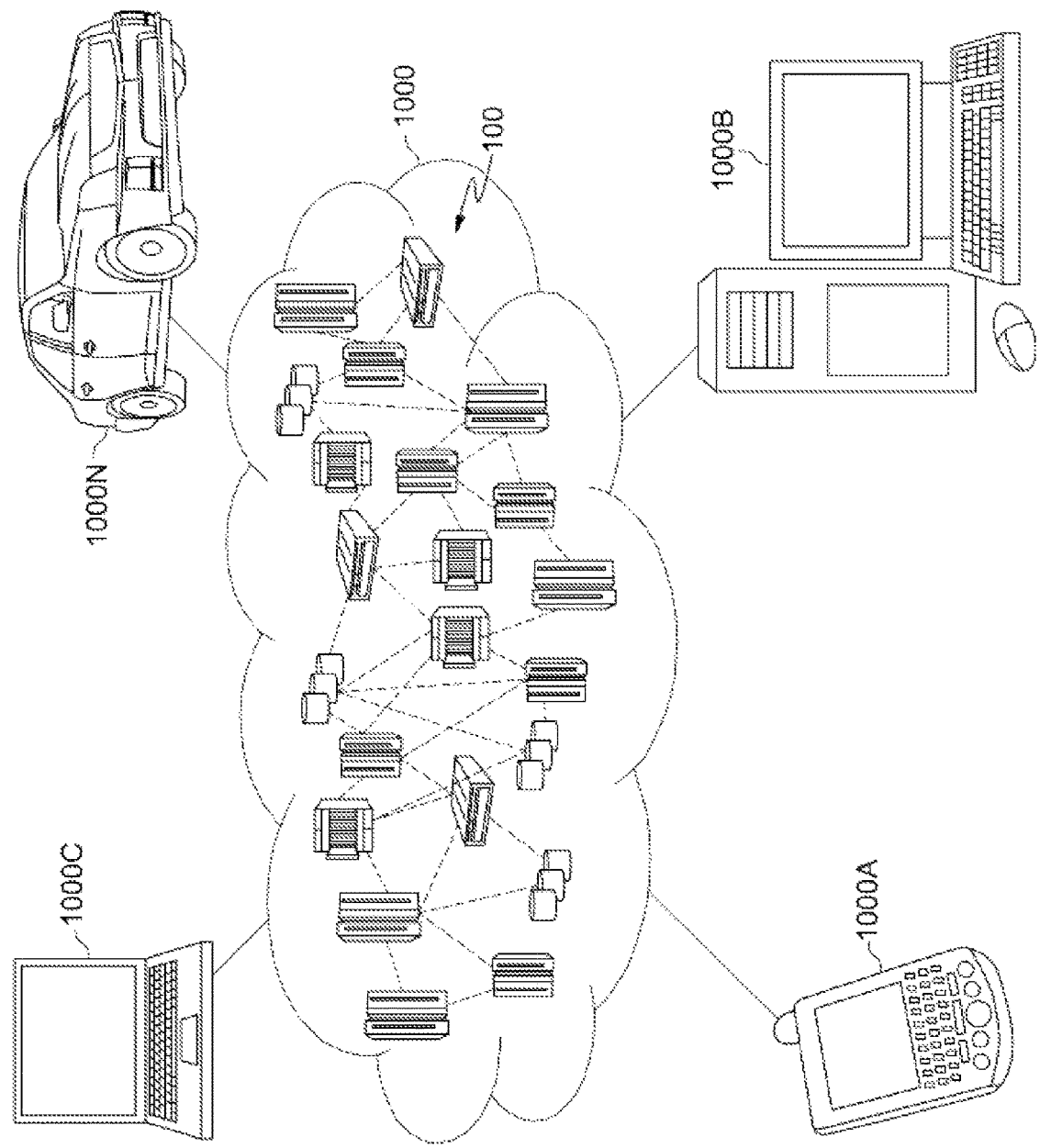
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
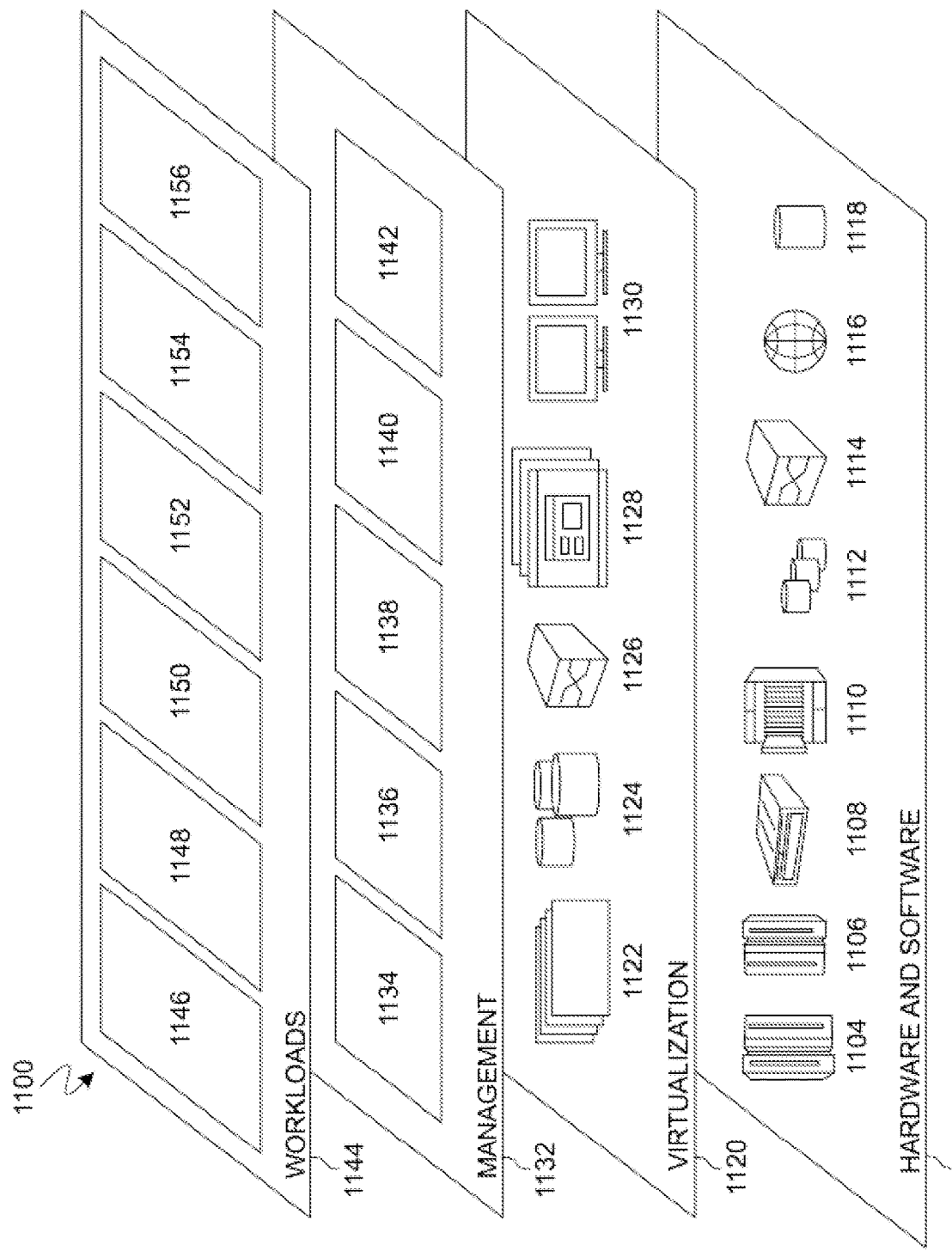
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and secure storage 1156. A secure storage program 110a, 110b provides a way to secure user data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for securing data storage, the method comprising:

completing a registration and an authentication process between a client device, a server, and a third-party device, wherein the registration and the authentication process include:

sending, by the client device, a connection request to the server;

generating, by the server, the salt and a registration session ID for the client device based on the sent connection request;

sending, by the server, the generated salt and the generated registration session ID to the client device;

sending, by the server, the generated registration session ID and the server encryption key to the third-party device;

sending, by the client device, user data and the generated registration session ID to the third-party device;

generating, by the third-party device, a third-party encryption key based on the sent registration session ID, server encryption key and user data;

encrypting, by the third-party device, user data based on the received user data, server encryption key and registration session ID;

sending, by the third-party device, encrypted user data and the generated registration session ID to the server;

storing, by the server, the encrypted user data;

sending, by the client device, the connection request to the server;

generating, by the server, an authentication session identification (ID) for the client device based on the sent connection request;

sending, by the server, a stored salt and the generated authentication session ID to the client device based on the connection request;

sending, by the server, the generated authentication session ID, the server encryption key and user data to the third-party device;

sending, by the client device, the generated authentication session ID and user data to the third-party device;

generating, by the third-party device, a decryption key based on the received authentication session ID, server encryption key and user data received by the client device and the server; and determining, by the third-party device, the user data received by the client device and the decrypted user data received by the server is authenticated.

2. The method of claim 1, wherein the user data is selected from the group consisting of a user password, identifying user data and sensitive user data.

3. The method of claim 1, wherein the salt is a plurality of random data combined with the user password.

4. The method of claim 1, wherein the decryption key is a temporary decryption key.

5. The method of claim 2, wherein the identifying user data may be selected from the group consisting of a username, a user ID, a user personal identification number, a name, a phone number, an address, and an account number.

6. The method of claim 2, wherein the sensitive user data includes biometric data.

7. A computer system for securing data storage, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

completing a registration and an authentication process between a client device, a server, and a third-party device, wherein the registration and the authentication process include:

sending, by the client device, a connection request to the server;

generating, by the server, the salt and a registration session ID for the client device based on the sent connection request;

sending, by the server, the generated salt and the generated registration session ID to the client device;

sending, by the server, the generated registration session ID and the server encryption key to the third-party device;

sending, by the client device, user data and the generated registration session ID to the third-party device;

generating, by the third-party device, a third-party encryption key based on the sent registration session ID, server encryption key and user data;

encrypting, by the third-party device, user data based on the received user data, server encryption key and registration session ID;

sending, by the third-party device, encrypted user data and the generated registration session ID to the server;

storing, by the server, the encrypted user data;

sending, by the client device, the connection request to the server;

generating, by the server, an authentication session identification (ID) for the client device based on the sent connection request;

sending, by the server, a stored salt and the generated authentication session ID to the client device based on the connection request;

sending, by the server, the generated authentication session ID, the server encryption key and user data to the third-party device;

sending, by the client device, the generated authentication session ID and user data to the third-party device;

generating, by the third-party device, a decryption key based on the received authentication session ID, server encryption key and user data received by the client device and the server; and determining, by the third-party device, the user data received by the client device and the decrypted user data received by the server is authenticated.

8. The computer system of claim 7, wherein the user data is selected from the group consisting of a user password, identifying user data and sensitive user data.

9. The computer system of claim 7, wherein the salt is a plurality of random data combined with the user password.

10. The computer system of claim 7, wherein the decryption key is a temporary decryption key.

11. The computer system of claim 8, wherein the identifying user data may be selected from the group consisting of a username, a user ID, a user personal identification number, a name, a phone number, an address, and an account number.

12. The computer system of claim 8, wherein the sensitive user data includes biometric data.

13. A computer program product for securing data storage, comprising:

one or more computer-readable storage medium and program instructions stored on at least one of the one or more tangible storage medium, the program instructions executable by a processor, the program instructions comprising:

program instructions to complete a registration and an authentication process between a client device, a server, and a third-party device, wherein the registration and the authentication process include:

program instructions to send, by the client device, a connection request to the server;

program instructions to generate, by the server, the salt and a registration session ID for the client device based on the sent connection request;

program instructions to send, by the server, the generated salt and the generated registration session ID to the client device;

program instructions to send, by the server, the generated registration session ID and the server encryption key to the third-party device;

program instructions to send, by the client device, user data and the generated registration session ID to the third-party device;

program instructions to generate, by the third-party device, a third-party encryption key based on the sent registration session ID, server encryption key and user data;

program instructions to encrypt, by the third-party device, user data based on the received user data, server encryption key and registration session ID;

program instructions to send, by the third-party device, encrypted user data and the generated registration session ID to the server;

program instructions to store, by the server, the encrypted user data;

program instructions to send, by the client device, the connection request to the server;

program instructions to generate, by the server, an authentication session identification (ID) for the client device based on the sent connection request;

program instructions to send, by the server, a stored salt and the generated authentication session ID to the client device based on the connection request;

program instructions to send, by the server, the generated authentication session ID, the server encryption key and user data to the third-party device;

program instructions to send, by the client device, the generated authentication session ID and user data to the third-party device;

program instructions to generate, by the third-party device, a decryption key based on the received authentication session ID, server encryption key and user data received by the client device and the server; and program instructions to determine, by the third-party device, the user data received by the client device and the decrypted user data received by the server is authenticated.

14. The computer program product of claim 13, wherein the user data is selected from the group consisting of a user password, identifying user data and sensitive user data.

15. The computer program product of claim 13, wherein the salt is a plurality of random data combined with the user password.

16. The computer program product of claim 13, wherein the decryption key is a temporary decryption key.

17. The computer program product of claim 14, wherein the identifying user data may be selected from the group consisting of a username, a user ID, a user personal identification number, a name, a phone number, an address, and an account number, and wherein the sensitive user data includes biometric data.

* * * * *